(No Model.)

J. E. FEELY.
PIPE DRILLING DEVICE.

No. 525,385. Patented Sept. 4, 1894.

Witnesses.
Lauritz N. Möller
Kittie M. Hanson.

Inventor.
James E. Feely
by Alban Andrew
his atty.

UNITED STATES PATENT OFFICE.

JAMES E. FEELY, OF MALDEN, MASSACHUSETTS.

PIPE-DRILLING DEVICE.

SPECIFICATION forming part of Letters Patent No. 525,385, dated September 4, 1894.

Application filed May 16, 1894. Serial No. 511,458. (No model.)

*To all whom it may concern:*

Be it known that I, JAMES E. FEELY, a citizen of the United States, and a resident of Malden, in the county of Middlesex and State of Massachusetts, have invented new and useful Improvements in Pipe-Drilling Devices, of which the following, taken in connection with the accompanying drawings, is a specification.

This invention relates to improvements in pipe drilling devices for the purpose of drilling holes through Artesian well pipes or other pipes from the interior of such pipes as may be desirable for the purpose of allowing the water around such well pipe to enter the latter as well as for other purposes where it is desirable to drill holes through pipes from the inside as will hereinafter be more fully shown and described reference being had to the accompanying drawings, wherein—

Figure 1:
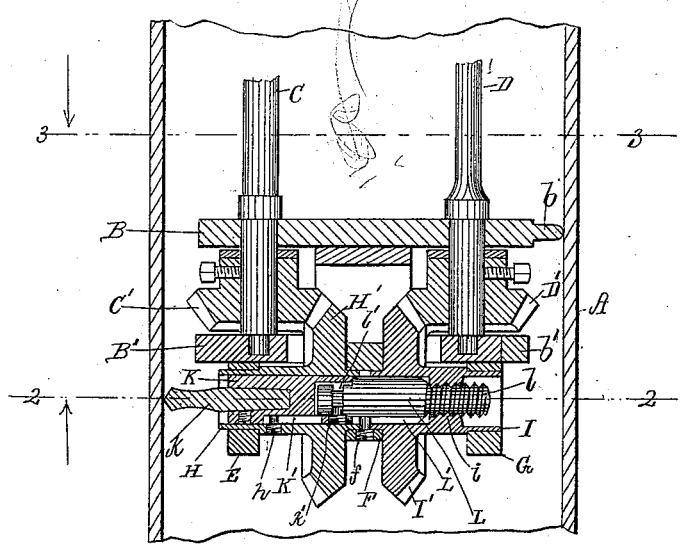
Figure 2:
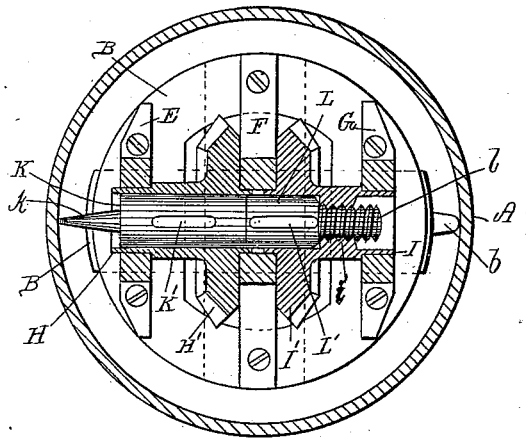

Figure 1, represents a central longitudinal section of my improved pipe drilling device shown as arranged within a pipe to be drilled. Fig. 2, represents a cross section on the line 2—2 in Fig. 1 showing the spindle in elevation; and Fig. 3, represents a cross section on the line 3—3 shown in Fig. 1.

Similar letters refer to similar parts wherever they occur on the different parts of the drawings.

A represents the metal pipe that is to be drilled from the inside by means of my improved device which consists of a suitable frame B B' in bearings in which are journaled the respective drill rotary and feed shafts C, D, as shown.

Figure 3:
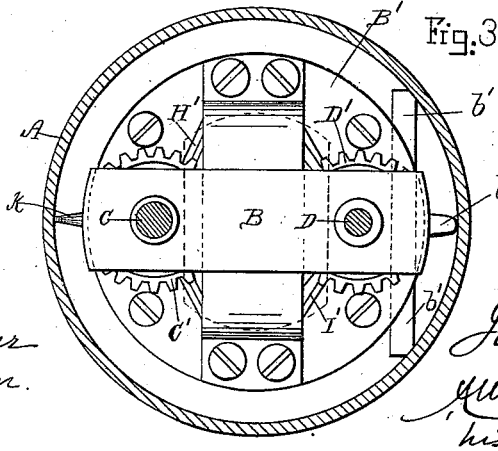

To the drill rotary shaft C is secured a bevel gear C'; and to the drill feed shaft D is secured a similar bevel gear D' as shown in Figs. 1 and 3.

E, F, and G, are bearings secured to the under side of the frame portion B' as shown in Figs. 1 and 2. In the bearings E and F is journaled the sleeve H to which is secured or made in one with it the bevel gear H' the teeth of which mesh in the teeth of the bevel gear C' as shown. In the bearings F, G, is journaled the sleeve I to which is secured or made in one piece with it a similar bevel gear I' the teeth of which mesh in the teeth of the bevel gear D' as shown.

$k$ is the drill which is inserted and secured in a socket or recess in the outer end of the drill spindle K which is adapted to move longitudinally within the sleeve H and adapted to rotate with it and for this purpose it is provided with a longitudinal slot or groove K' into which projects the inner end of a screw $h$ screwed through the sleeve H as shown in Figs. 1 and 2.

Within the sleeve I is journaled the feed spindle L which is adapted to move longitudinally within the sleeve I without rotating with the latter and for this purpose said spindle is provided with a longitudinal slot or groove L' into which projects the inner end of a screw $f$ which is secured through the stationary middle bearing F as shown. The outer end $l$ of the spindle L is screw threaded as shown in Figs. 1 and 2; and adapted to work in a nut or screw threaded recess $i$ in the sleeve I as shown in said Figs. 1 and 2.

The drill spindle K is longitudinally adjusted by the longitudinally movable feed spindle L and for this purpose the front end of the latter projects into an end recess in the drill spindle and is provided with an annular groove $l'$ into which projects the inner end of a screw $k'$ which is screwed through a portion of the drill spindle K as shown in Fig. 1.

It will thus be seen that a rotary drilling motion is imparted to the drill $k$ by rotating the shaft C; and it will also be seen that a longitudinal feed motion will be imparted to the said drill by turning the shaft D in one direction, and it will be moved in an opposite direction by reversing the rotation of said shaft D.

The shafts C and D may be of any desired lengths according to the position of the holes to be drilled through the side of the pipe A, and said shafts may be made each in one or more parts suitably coupled together as may be desirable according to the depth from the surface at which the holes are to be drilled without departing from the essence of my invention.

$b$ and $b'$ $b'$ are rest projections on the respective frame portions B and B' which projections are adapted to bear against the interior of the pipe to be drilled and serve as back rests for the drilling device while it is in operation.

In using the device the shaft D is first turned sufficiently to draw back the drill and its spindle to enable the apparatus to be freely inserted in the pipe and lowered therein according to the position of the hole or holes to be drilled after which the shaft D is turned so as to feed the drill onward against the interior of the pipe. The shaft C is then rotated causing the drill k to be set in rotation and fed from time to time by turning the shaft D as above described. When the drilling operation is completed the shaft D is turned so as to cause the drill to be withdrawn from the pipe and the apparatus changed in position for drilling another hole or removed from within the pipe as the case may be.

Having thus fully described the nature, construction, and operation of my invention, I wish to secure by Letters Patent and claim—

The herein described pipe drilling device consisting of a frame having journaled therein a drill rotary shaft C and a drill feed shaft D combined with a rotary and longitudinally adjustable drill spindle K arranged within the sleeve or hub of a gear actuated by the drill rotary shaft and a non rotary and longitudinally adjustable feed spindle L loosely connected to the drill spindle and having a screw threaded end working in a nut in the hub or sleeve of a gear actuated by the feed shaft substantially as and for the purpose set forth.

In testimony whereof I have signed my name to this specification, in the presence of two subscribing witnesses, on this 15th day of May, A. D. 1894.

JAMES E. FEELY.

Witnesses:
ALBAN ANDRÉN,
O. B. HALL.